United States Patent [19]

Becker et al.

[11] Patent Number: 4,731,814
[45] Date of Patent: Mar. 15, 1988

[54] COMPUTER-CONTROLLED CORDLESS TELEPHONE

[75] Inventors: William R. Becker, Red Bank; James J. Boyd, III; William J. Clifford, both of Randolph; Paul B. Newland, Red Bank, all of N.J.

[73] Assignee: AT&T Information Systems Inc. American Telephone & Telegraph Company, Murray Hill, N.J.

[21] Appl. No.: 831,557

[22] Filed: Feb. 21, 1986

[51] Int. Cl.$^4$ .............................................. H04Q 7/04
[52] U.S. Cl. .................................... 379/62; 455/127
[58] Field of Search .............. 179/2 EA, 2 EB, 2 EC; 455/73, 127, 343; 379/62

[56] References Cited

U.S. PATENT DOCUMENTS

| 4,039,760 | 8/1977 | Gregory et al. | 179/2 EA |
| 4,574,163 | 3/1986 | Zato | 179/2 EA |

FOREIGN PATENT DOCUMENTS

| 0016513 | 2/1978 | Japan | 455/343 |
| 0047345 | 3/1983 | Japan | 455/343 |
| 0182234 | 9/1985 | Japan | 455/343 |
| 82/01268 | 4/1982 | PCT Int'l Appl. | 455/343 |

Primary Examiner—Robert Lev
Attorney, Agent, or Firm—Samuel R. Williamson

[57] ABSTRACT

A computer-controlled cordless telephone system having a base unit and a handset unit provides for increased functionality in communications between the base unit and the handset unit, and also provides a controlled power-up/power-down mode of operation for the handset unit. Increased functionality is achieved by employing a message format for control signals transmitted between the base unit and the handset unit in the form of frequency shift keyed (FSK) signals which include a data field. This data field may be in the form of either opcode data or digit data, thereby allowing for many different commands or functions. Power to a computer, a receiver and certain other selected circuitry in the handset unit is controlled to minimize power consumption when the handset unit is in an out-of-cradle-and-standby state. Power to other nonessential circuitry in the handset unit is turned completely off during this state. The handset unit automatically turns on to a full operating mode from the alternating power-up/power-down mode in response to events such as (1) a user depressing a key no the keypad of the handset unit for either initiating a telephone calls or paging the base unit, and (2) the base unit detecting an incoming ringing signal on the telephone lines.

34 Claims, 9 Drawing Figures

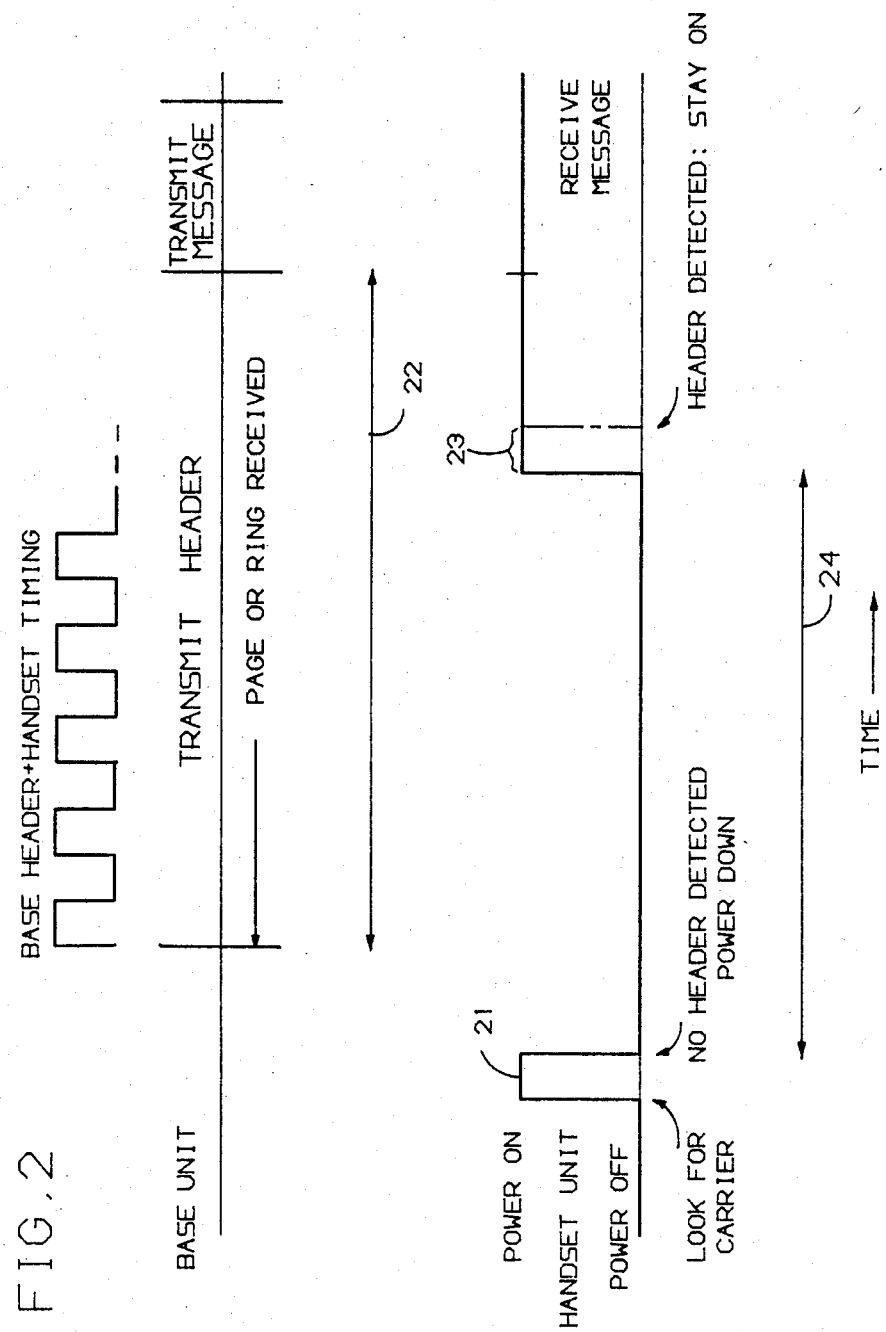

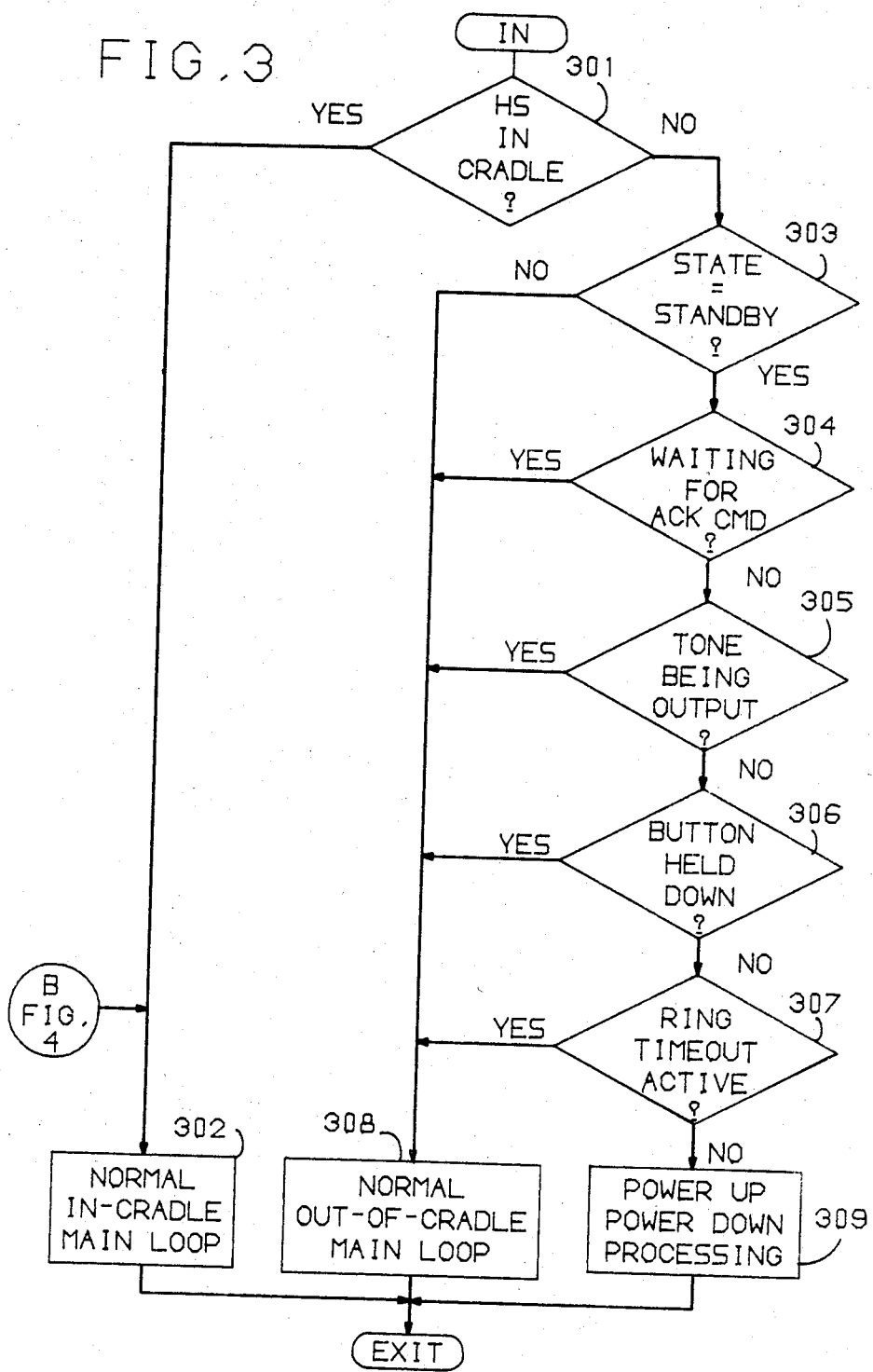

FIG. 5

| OPCODE | DESCRIPTION | HANDSET UNIT ORIGINATE | HANDSET UNIT ACKNOWLEGDE | BASE UNIT ORIGINATE | BASE UNIT ACKNOWLEGDE |
|---|---|---|---|---|---|
| 1 | END RING TONE | | | * | |
| 2 | BEGIN RING TONE | | * | * | |
| 3 | INTERCOM MODE | * | | | |
| 4 | STANDBY MODE | * | | | * |
| 5 | TALK MODE | * | | | * |
| 6 | BASE PAGE | | * | * | * |
| 7 | HANDSET PAGE | * | | | |
| 8 | SWITCHHOOK FLASH | * | | | |
| 9 | TALK MODE (TEL. MODE ONLY) | | * | * | |
| A | CHANNEL CHANGE | * | | | |
| B | REDIAL | * | | | |
| C | DTMF REQUEST | * | | | |
| D | CHANNEL CHANGE ACKNOWLEDGE | * | | * | |
| E | DIAL DIGIT 0-9 | * | | | |

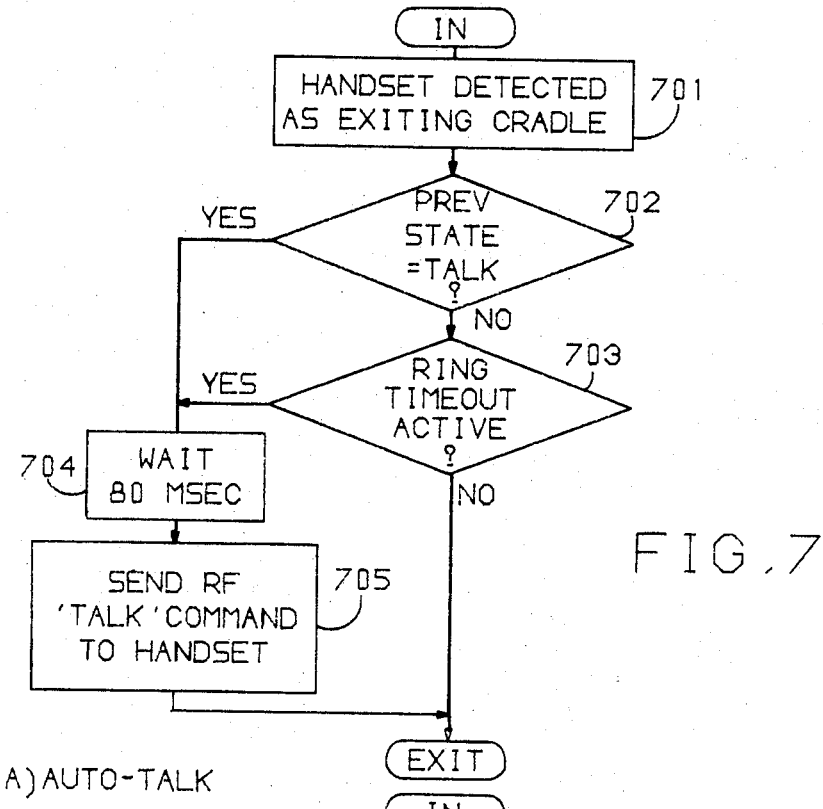
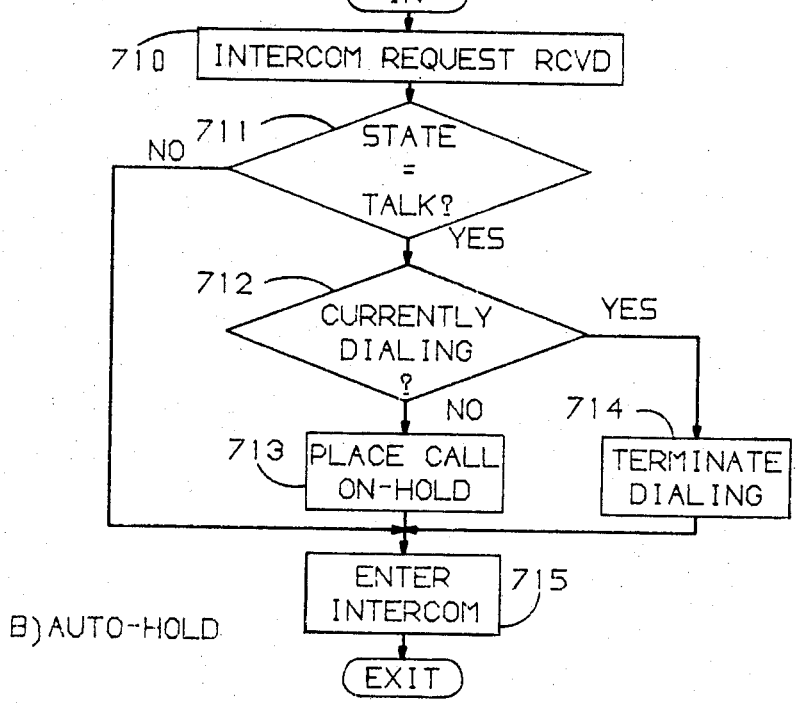
FIG. 7

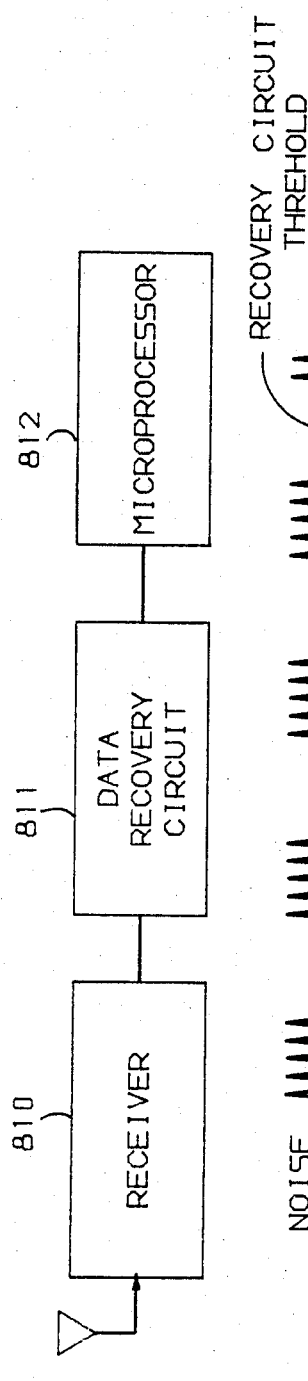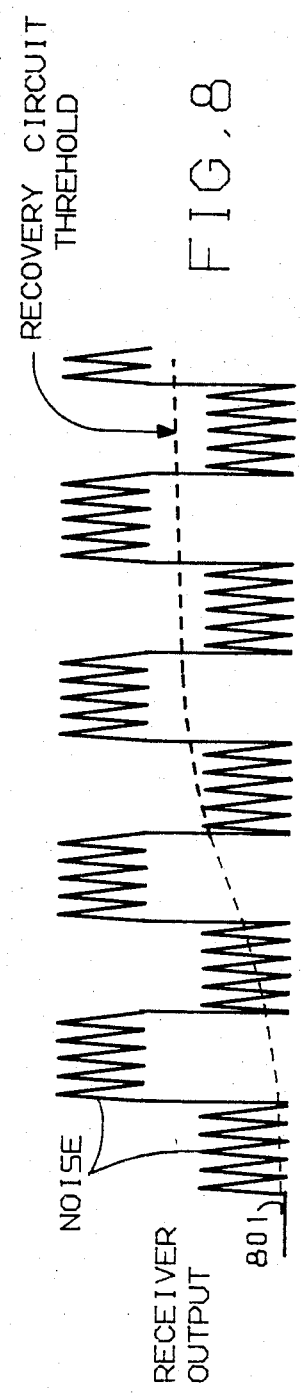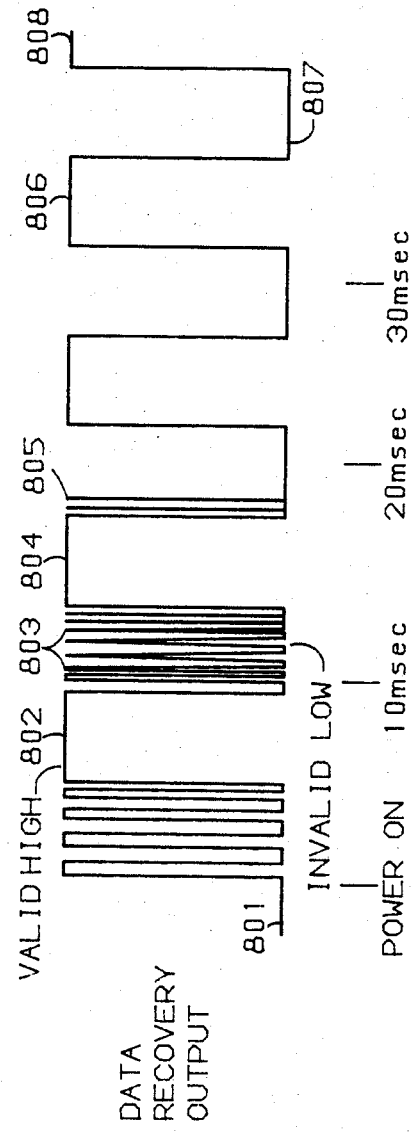
FIG. 8

COMPUTER-CONTROLLED CORDLESS TELEPHONE

BACKGROUND OF THE INVENTION

1. Technical Field

This invention relates to cordless telephones and more particularly to a cordless telephone employing a computer for providing increased functionality and for extending the useful battery life of such telephone.

2. Description of the Prior Art

A typical cordless telephone system includes a handset or remote unit and a base unit. The base unit is connected to the telephone lines and includes an antenna, a transmitter and a receiver for communicating a radio frequency carrier signal that is modulated by switching signals and audio signals to and from the handset unit as appropriate. Power for operation of the base unit is obtained from local line power. The handset unit includes a speaker and a microphone, and also an antenna, a transmitter and a receiver for likewise communicating telephone switching signals and audio signals to and from the base unit. Power for operation of the handset unit is obtained from a battery contained therein. This battery is usually charged by the local line power when the handset unit is placed in a cradle located in the base unit.

In the operation of a typical cordless telephone handset unit in originating and receiving a call, the receiver of the handset unit normally remains in a oncondition whenever the handset unit is removed from the base unit. If a user desires to place a call from the handset unit, the transmitter in the handset unit generates a control signal that is transmitted to the base unit. Upon receipt and detection of the control signal, the base unit seizes the telephone lines so as to enable audio signals and switching signals from the handset unit that are received by the base unit within a given audio frequency band to be passed onto the telephone lines. If an incoming telephone ringing signal is sensed by the base unit, reflecting an incoming call, the base unit, in turn, transmits this ringing signal to the handset unit where it is detected by the handset unit receiver which activates a ringer in the handset unit.

High battery drain current limits the period of time for reliable operation of handset units while located remote from associated base units. In order to extend this time and yet insure reliable operation for an extended period, some arrangements in the known art have resorted to installing an auxiliary or paging type ringer extension associated with the base unit or another part of the local telephone station where local line power is available. Thus when an incoming telephone ringing signal is noted on the ringer extension, the user of the handset unit activates the power-on switch of the handset unit and answers the telephone call remotely. Once the telephone conversation is over, the user shuts off the handset unit to conserve power once again. In this type of arrangement, however, the user must always be within hearing range of the ringer extension.

In order to extend battery life in the handset unit of a cordless telephone, one specific arrangement disclosed in U. S. Pat. No. 4,039,760 and issued to L. D. Gregory et al. on Aug. 2, 1977, proposes turning off the transmitter in the handset unit when the telephone is not in use and the handset unit is on-hock, i.e., no telephone call is in progress. While monitoring for a telephone ring signal, battery power is conserved by reducing the on-time of the receiver and control circuitry in the handset unit. In this arrangement, a tone decoder in the handset unit detects an audio tone of 3 KHz that is transmitted by the base unit to the handset unit whenever a ringing signal is received by the base unit from the telephone line. Similarly, a tone decoder in the base unit detects an audio tone of 3 KHz that is transmitted from the handset unit to the base unit for initiating a call from the handset unit.

While this type of arrangement reduces power consumption in cordless telephone handset units and extends battery life, it is quite susceptible to radio frequency (RF) interference in communications between the handset unit and the base unit. In the handset unit, e.g., the receiver is activated by the reception of a modulated carrier and is, therefore, subject to false activation signals possibly due to other cordless telephones in its reception range transmitting a modulated carrier on the frequency to which the receiver is then tuned, or any source of noise occurring at this carrier frequency. In communications from the base unit to the handset unit, the arrangement also does not allow for functionality other than the base unit providing a ringing signal to the handset unit.

Other disadvantages are known to exist with this specific arrangement. In communications from the handset unit to the base unit, access to the base unit is provided in the arrangement by the handset unit transmitting the modulated carrier signal. Other handset units belonging to other cordless telephone owners in the reception range of the base unit will also be able to obtain access to the telephone line through this same base unit as long as the same modulated carrier signal is utilized. Other possible undesirable interactions may occur as base units respond to other base units and handset units respond to or are activated by other handset units within their common reception range.

While the foregoing type of arrangement in a cordless telephone system has been generally satisfactory in the past in those environments having few cordless telephones and few other sources of potential RF interference nearby that could affect the operation of this type of system, it is now technically feasible and desirable to provide a cordless telephone system that provides increased battery life along with greater functionality while remaining relatively inexpensive and easy to operate.

SUMMARY OF THE INVENTION

In accordance with the invention there is provided a computer-controlled cordless telephone system in which increased functionality and a controlled power-up/power-down mode of operation for a handset unit are implemented. In this system, power to the receiver, computer and certain other selected circuitry in the handset unit is controlled to minimize power consumption when the handset unit is in a standby-and-out-of-cradle state. In this standby-and-out-of-cradle state, the handset unit is considered to be in the "power-up/power-down" mode. The handset unit resides in this state while not being used by a user in communicating with the base unit. Power to other non-essential circuitry in the handset unit is turned completely off during this state.

During the power-up/power-down mode of operation, multiple events can cause the computer to turn on to a full operating mode from the alternating power-up/power-down mode. A key depression on the handset unit, detection of a digitally formatted RF signal transmitted from the base unit, and the handset unit being cradled in the base unit for charging, are all events which cause the computer to turn on to and remain in the full operating mode until processing on these events is completed.

In order to provide for increased functionality in accordance with the invention, a message format for the RF signals transmitted between the base unit and the handset unit is provided in the form of frequency shift keyed (FSK) signals and includes a data field. This data field may be in the form of either command opcode data or dial digit data, thereby allowing for many different commands or functions. The message format also includes a synchronizing signal that immediately precedes the data field.

Three opcode commands or functions incorporated into the cordless telephone system and providing increased functionality are ring-on ring-off and page. The ring-on opcode is generated in response to the base unit detecting the presence of an incoming ringing signal on the telephone lines. And the ring-off opcode is generated in response to the base unit detecting that the incoming ringing signal has being removed from the telephone lines. The page opcode is generated and transmitted in response to a page button being depressed on either the handset unit or the base unit for establishing intercom type communications.

In accordance with the invention, any communications between the base unit and the handset unit are established first through interpretation of the data field in the FSK signals. By way of example, when the base unit receives the incoming ringing signal on the telephone lines, it transmits the FSK signal with the ring-on opcode to the handset unit changing the handset unit from the alternating power-up/power-down mode to the full operating mode. But before the handset unit will respond to the base unit, a security code that the handset unit recognizes also must be in the data field received by the handset unit. The security code identifies the transmitting base unit as being the correct base unit to which the handset unit should respond. All other signals received on this frequency without a security code that the handset unit recognizes are ignored, and the handset unit remains in the power-up/power-down mode of operation. This common security code is also included in any transmission of the FSK signals from the handset unit to the base unit and must similarly identify the handset unit as being the correct handset unit to which the base unit should respond.

BRIEF DESCRIPTION OF THE DRAWINGS

The invention and its mode of operation will be more clearly understood from the following detailed description when read with the appended drawing in which:

FIG. 2 is a timing diagram for illustrating the power cycling operation of the cordless telephone system in accordance with the invention;

FIGS. 3, 4A and 4B depict flow charts illustrating some of the processing performed by the circuit components of the handset unit of FIG. 1 in accordance with the invention;

FIG. 5 is a table showing opcode values that are used in communicating identified functions and commands between the handset unit and the base unit in accordance with the invention.

FIG. 7 depicts flow charts illustrating automatic mode selection functions embodied in the invention; and FIG. 8 shows an arrangement that provides enhanced performance for receiver circuitry of handset units having large stabilization times in the power-up processing operation.

DETAILED DESCRIPTION

Figure 1:
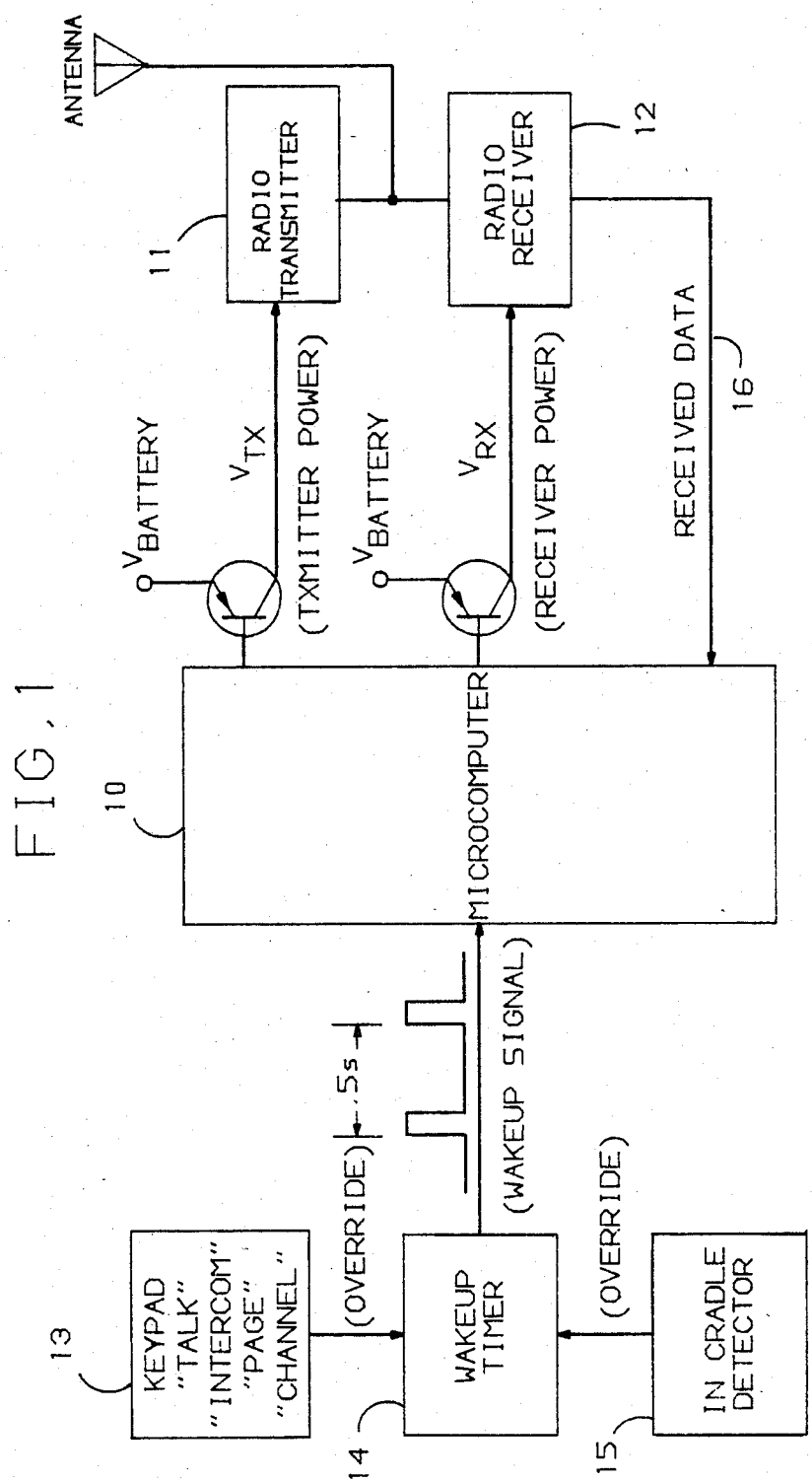
FIG. 1 is a functional block representation of a cordless telephone handset unit incorporated in a cordless telephone system operative in accordance with the principles of the present invention.

Referring now to FIG. 1 of the drawing, there is shown a general block diagram of certain select circuitry of a cordless telephone handset unit that provides increased functionality and incorporates a power cycling arrangement operative in accordance with the principles of the present invention. Elements in the handset unit include a microcomputer 10, radio transmitter 11 and a radio receiver 12. Microcomputers are commercially available. A microcomputer commercially available from National Semiconductor Corporation as Part No. COP420C may be used for microcomputer 10 with the proper programming. The transmitter 11 and receiver 12 are conventionally employed in cordless telephones and are used for respectively transmitting signals to and receiving signals from an associated base unit (not shown). Power for the transmitter 11 and receiver 12 is controlled by the microcomputer 10, but independently so that each may be turned on either separately or in combination by the microcomputer.

Operably connectable to the microcomputer 10 through a wake-up timer 14 is a keypad 13 for selecting such functions as talk, intercom and page modes for the handset unit to communicate with the associated base unit. Also connectable to the microcomputer 10 through the wake-up timer 14 is an in-cradle detector 15 which detects when the handset unit is inserted in a mating cradle on the base unit.

While the handset is in the standby-and-out-of-cradle state, the microcomputer 10 turns off power to the receiver 12, puts itself to sleep and halts its internal clock. In order to be awakened, an external positivegoing pulse signal is provided to an appropriate input of the microcomputer 10 each one-half second by the wake-up timer 14 to start the internal clock of the microcomputer running again. Each time the clock starts running, the microcomputer 10 wakes up and, in turn, turns on the receiver 12 for determining if a RF signal is being transmitted from the base unit. If not, the microcomputer 10 again turns off power to the receiver 12 and to itself. This low power operating mode continues as long as an RF signal is not transmitted from the base unit. If an RF signal is being transmitted from the base unit, this signal is coupled to the microcomputer 10 from the receiver 12 over a receive data line 16. If the microcomputer 10 detects a FSK signal from the base unit, the microcomputer continues to enable the receiver 12 beyond its normal ON time in order to look for a synchronization signal and an opcode in the RF signal received from the base unit. If the opcode is received, the microcomputer 0 acts appropriately thereupon.

Multiple opcodes transmitted by the base unit and received by the receiver in the associated handset unit causes both the receiver 12 and microcomputer 10 to remain on for the time necessary to complete a function or execute a command required by the received opcode. One such opcode may be a page command (opcode 6 hex), whereby upon receipt, the handset unit creates an alerting signal. The microcomputer 10 and receiver 12 remain awake for the duration of this signal. Reference to the Table shown in FIG. 5 for this and other opcode values is suggested.

Another opcode receivable by the handset unit from the base unit is a ring-on signal (opcode 2 hex) wherein the microcomputer 10 remains awake and keeps the receiver 12 in an on condition in order to receive further ringing signals. Operation of the handset unit in response to this opcode is described in greater detail later herein and with reference to FIG. 6.

The low power operating mode of the handset unit is overridden when the handset unit is placed into the mating cradle in the base unit. In this instance, the wakeup timer 14 detects an in-cradle condition and enables the microcomputer 10 so that an exchange of data between the handset unit and base unit can take place through battery charge contacts (not shown) then existing there between.

If the user of the cordless telephone desires to use the handset unit in a talk, intercom or page mode, pressing the corresponding button for either of these features also overrides the normal standby low power operating mode of the handset unit. Pushing either of the buttons on the keypad 13 causes the wakeup timer to provide a constant high level signal to go to the microcomputer 10, which, in turn, then scans the keypad 13 to determine which key was pushed.

Certain of the selectable features available on the keypad 13 are provided to facilitate better intercommunications between the handset and base units. One such feature is a channel change button activatable by the user of the handset unit without having to return and cradle the handset unit into the base unit. When a channel change is desired because of noise or other interference, either before initiating a call or while a call is in progress, the channel change button on the handset unit is activated. This sends the opcode A hex, shown in the table in FIG. 5, to the base unit which in turn activates an RF channel change sequence to move the transmitters and receivers of both the handset unit and base unit to the next RF channel. Thus a user of the handset unit may move off a noisy channel to a clearer channel, all the while continuing a call in progress.

Other feature improvements are embodied in the invention to anticipate the state that is expected to be requested by a user under certain conditions and to automatically place the handset unit in such predicted state without waiting for a user command. These are discussed in greater detail later herein and with reference to FIG. 7.

Referring next to FIG. 2, there is shown the timing diagram for illustrating the operation of the cordless telephone system in providing increased functionality and a power-up/power-down mode of operation for the handset unit. The timing for transmission of a message format from the base unit is shown on the upper line in this figure and the timing for activation of the handset unit for receipt of this message format is shown on the lower line.

The format for transmission of the RF messages between the base unit and handset unit are the same irrespective of the direction of the message, with the exception of a preamble or header used by the base unit initially to preface command messages in the standby-and-out-of-cradle state. The header is not included, however, when signaling is initiated from the handset unit to the base unit. This header is 575 milliseconds in length and comprises alternating 2.5 millisecond marks and spaces transmitted prior to a synchronization period and data field. The synchronization period is 16.5 milliseconds in length and is immediately followed by a 21 bit (36.75 millisecond) data field.

The data field may be comprised of either command opcode data or dial digit data. The 21 bits of the opcode data comprise a 16 bit security code, a 4-bit opcode and a single EVEN parity bit. The opcode data field comprises the digital command information codes, except those containing dial digit data. The 21 bits of the dial digit data field are comprised of the leading 12 bits of the security code, a 4-bit representation of the number to be dialed, an opcode of F-hex to indicate that dial digit data is contained therein and a single EVEN parity bit. Reference to the table shown in FIG. 5 is recommended for an illustration of the functions obtainable through inclusion of the appropriate codes in the transmitted data field.

As shown in FIG. 2, power to the receiver in the handset unit is provided over the time period of approximately 16 milliseconds as shown by pulse 21. During this period the receiver 12 is turned on to detect a header transmitted by the base unit. If a header is not detected, the microcomputer in the handset unit turns the power to the receiver off for a period length 24 of 500 milliseconds and then on again for another 16 milliseconds. This on and off period is repeated for each power cycle. If after the power-on period 21 of the power cycle, the base unit starts to transmit a header with its normal period length (575 milliseconds), the microcomputer will turn on the handset receiver for the 16 milliseconds time period as shown by pulse 23 in time to detect transmission of this header. In order to insure that each transmitted header is detected, the length of the power off-period for the handset unit receiver is designed such that the header will bridge across two power-on periods.

Referring next to FIG. 3, there is shown a flow chart illustrating the operation of the cordless telephone system with the desired functionality including criteria for the handset unit entering the power cycling mode. The functions provided by microcomputer 10 are advantageously determined by a process or program stored in read only memory (not shown).

The process is entered at decision 301 where a decision is made as to whether the handset is in the cradle on the base unit or located remote therefrom. If the handset is located in the cradle, the process enters the normal in cradle main loop and advances to step 302 where data is exchanged with the base and a common security code shared between the base and handset unit is updated. The security code is easily updated in the manner disclosed in the copending U.S. application "Security Arrangement for Cordless Telephone System" by R. E. Anglikowski et al., Ser. No. 718,037, filed on Mar. 29, 1985. There is no need for power cycling in the normal in-cradle main loop, because the handset is cradled and the battery is charged directly through mating contacts found on the base and handset units.

If it is found by the process in decision 301 that the handset unit is not in the cradle, a decision needs to be made as to whether to cycle the power or not. Decisions 303 through 307 provide the criteria for making this decision. In decision 303, a determination is made as to whether the handset unit is in the standby state wherein no communications is then occuring or expected to occur with the base unit. If not in the standby state, the process advances to step 303 which is the normal out-of-cradle main loop state wherein the handset unit is fully operational and power cycling does not take place. Examples of when the handset is in this state are when the cordless telephone is in the talk or intercom modes.

If it is determined in decision 303 that the handset unit is in the standby state, the process advances to decision 304 wherein it is noted in memory whenever the handset unit has previously transmitted a command to the base unit and is then awaiting an acknowledge code to be returned from the base unit. If at this decision, the process determines that the handset unit is awaiting an acknowledge code, the process advances to the step 306 where the power in the handset unit remains on. This acknowledge code must be received within 200 milliseconds from the time the command was transmitted to the base unit. Otherwise when next interrogated by the process, decision 304 will indicate that it is not awaiting an acknowledge code.

If it is determined that the handset unit is not awaiting an acknowledge code, or the 200 milliseconds time period elapses without receiving an acknowledge code, the process advances to decision 305. At this decision, a determination is made as to whether a tone is being provided to the acoustic sounder in the handset unit. If so, the process advances again to the step 308 where the handset receiver circuitry is kept turned on. If the tone is not being provided at the handset unit, however, the process advances to decision 306. In decision 306, a determination is made as to whether a button is being held down on the handset unit. If so, the process advances to step 308 where the handset receiver circuitry either turns on or is kept turned on. If not, the process advances to decision 307 wherein a decision is made as to whether a ring time-out process that is executed at the base unit is being executed. This process is described later herein and illustrated in FIG. 6. If the ring time-out active process is active, the process of this routine advances to step 308. If the ring time-out active process is not active, this process advances to step 309, the power up/power down processing step which is described in greater detail herein and illustrated in FIGS. 4A and 4B. When the processing is completed at either steps 302, 308 or 309, this routine is exited.

Figure 4A:
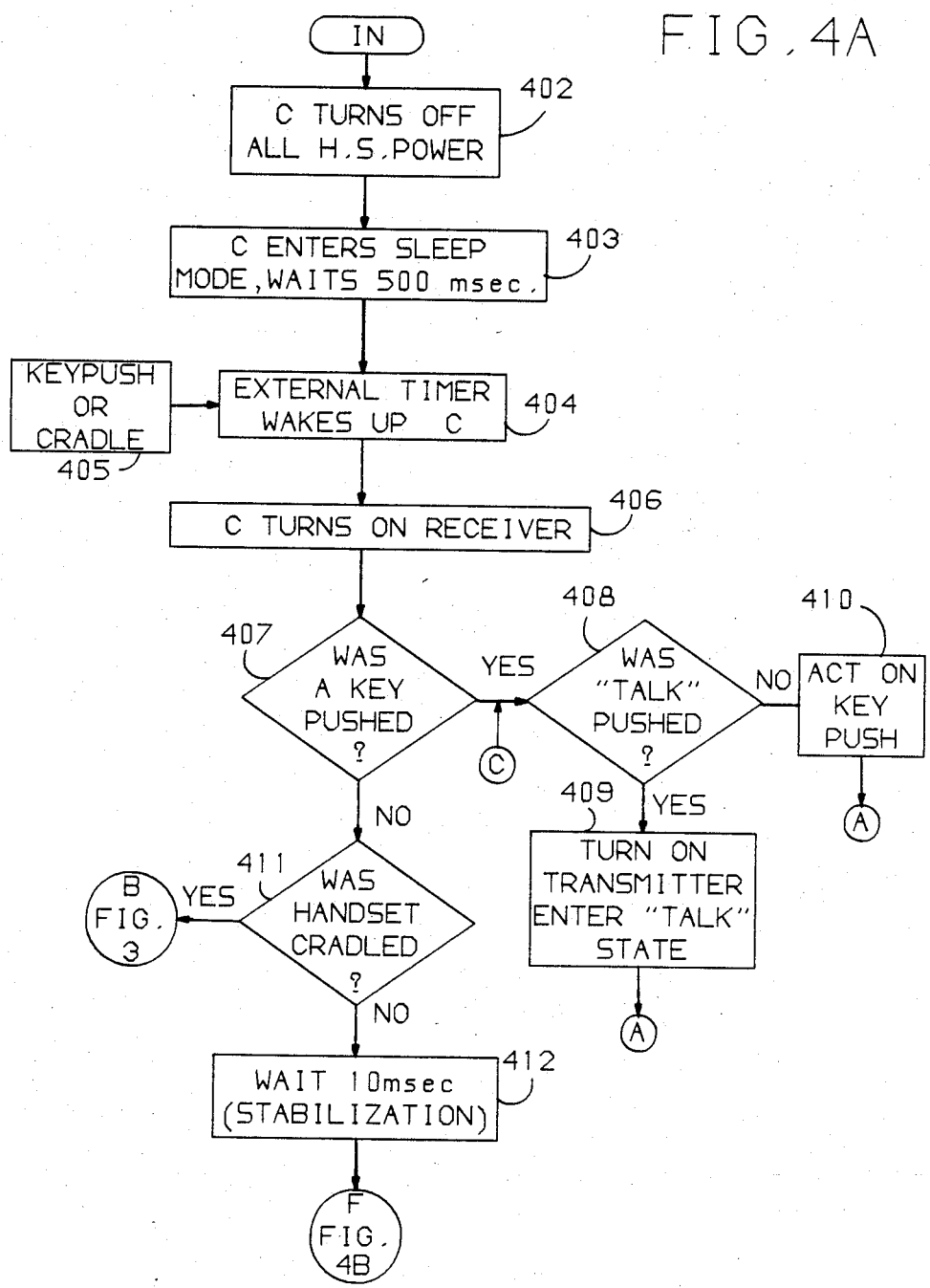
Figure 4B:
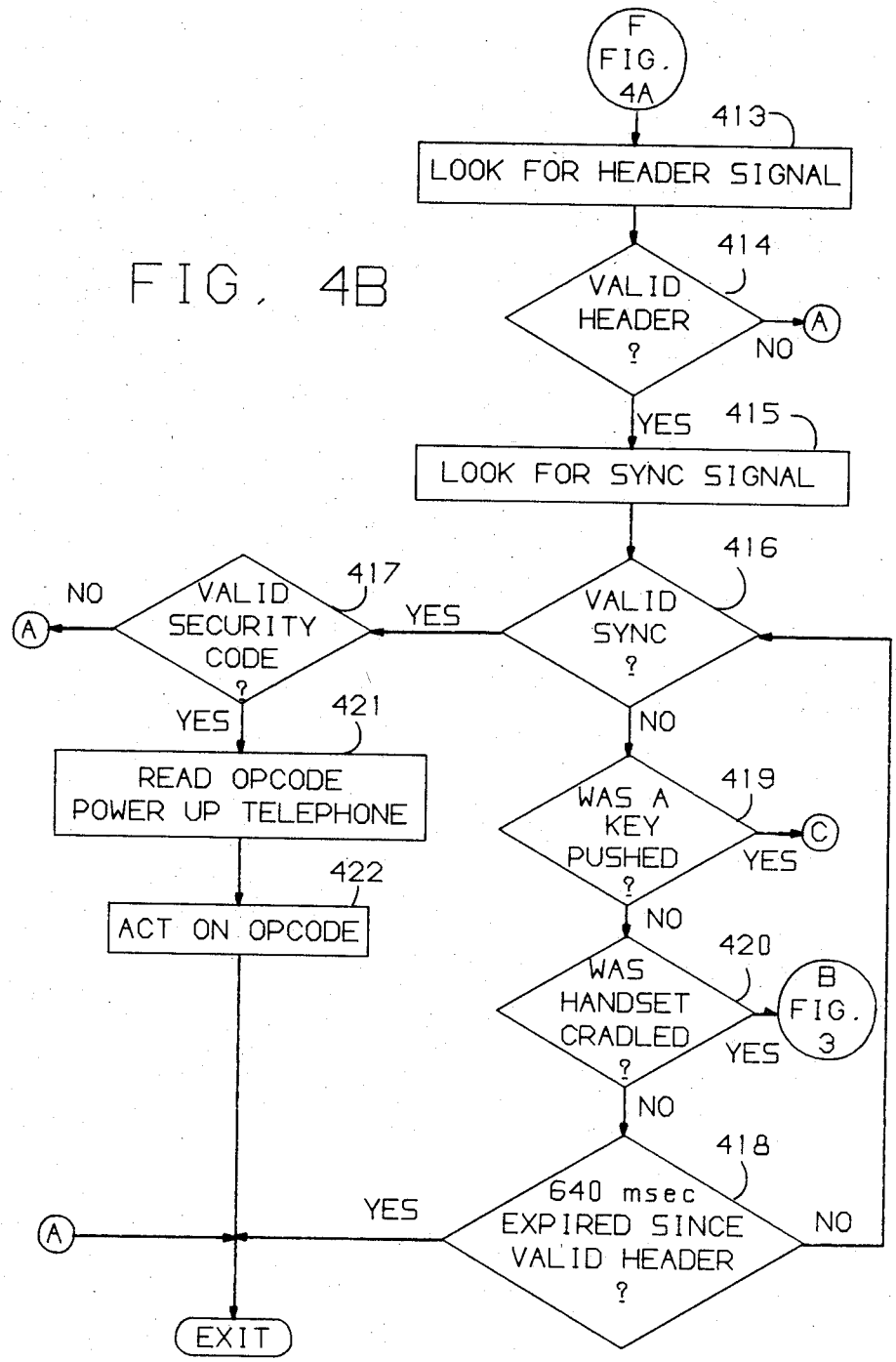

FIGS. 4A and 4B are flow charts illustrating in greater detail the power-up/power-down processing step 309 shown in FIG. 3. The routine for this processing step is entered at step 402 wherein the microcomputer in the handset unit turns off all the power in the handset unit except that to the wakeup timer. At step 403 the microcomputer enters a sleep mode, turns its own clock off for power conservation, and remains in such state until an external timer in step 404 automatically wakes it up after 500 milliseconds. An alternate way for the microcomputer to wake up is by a user of the handset unit to either push a key thereon or cradle the handset unit as in step 405.

Once the microcomputer is awakened, it turns on the receiver in step 406 and then the process advances to decision 407 where it is determined if a key was pushed. If a key was pushed, the process determines in decision 408 just which key was pushed. If the talk key was pushed, a number of steps occur in step 409. The first is that the transmitter is turned on, and a talk command (opcode 5 hex) is transmitted to the base unit for initiating the talk state jointly at the handset and base units. If the base unit responds within a predetermined time interval with the acknowledge code, the talk state is entered at the handset and base units and communications may then take place. Once the communications are over, the routine is exited by either pushing a standby key, which places the handset on-hook with respect to the base unit, or placing the handset unit in the mating cradle on the base unit. If the base unit does not respond to the handset unit with the acknowledge code within the predetermined time interval, the talk state is not entered, and the routine is automatically exited. If a key other than the talk key was pushed, such as, for example, transmit a page signal to the base unit, enter the intercom mode, or switch channels, the process responds with the appropriate action in step 410. Once this function is accomplished, the routine is exited.

If no key on the handset unit was pushed, the process advances to decision 411 where it is determined if the handset unit was cradled. If so, the process goes to step 302 in FIG. 3 where it is placed in the normal in-cradle main loop. If the handset was not cradled, the process advances to step 412 where it waits ten milliseconds to allow the receiver circuitry to stabilize.

After the stabilization period, the process looks for a header signal in step 413 and determines if the header is valid in decision 414. If a valid header is not detected after 16 milliseconds, the routine is exited. If a valid header is detected at decision 414, the process looks for a valid synchronization signal in step 415 and determines if the synchronization signal is valid in decision 416. If a valid synchronization signal is received at decision 416, the process then causes the microcomputer to check for and read the security code at decision 417. If the recieved security code is different from the one that the handset unit is then using, decision 417 causes the process to exit the routine, the assumption being made that another cordless telephone base unit transmitted the synchronization signal and data field.

If a header was detected in decision 414 but no valid synchronization signal followed it as determined by decision 416, then the process will continue to look for a synchronization signal for 640 milliseconds at decision 418. In this same time period, the process is also determining if a key on the handset unit keypad was pushed in decision 419 and if the handset unit was cradled in decision 420. If the synchronization signal is not received within this time period, the program is exited. If the security code is determined to be valid by decision 417, the process then reads the opcode and does whatever powering up of the telephone handset unit is necessary in step 421 in order to act on the received opcode in step 422. The program is then exited.

As earlier indicated, opcode (2 hex) is one of the opcodes receivable by the handset unit from the base unit. Upon receipt of this opcode, the microcomputer 10 remains awake and keeps the receiver 12 in an on-condition in order to receive further ringing signals. Once the ring-on opcode command has been detected by the microcomputer 10, the microcomputer 10 transmits the same opcode (ring on acknowledge) to the base unit, indicating that it has received the ring-on command and will remain awake for at least 6.5 seconds. The base unit receives a ring-on acknowledge command for each ring-on command received at the handset unit and does not transmit a header (series of alternating marks and spaces) for any subsequent ring-on command after receiving this acknowledge command.

Included in the base unit is a timer which expires 6.5 seconds after each ring-on opcode transmission. If the timer expires before the next ring-on acknowledge code is received from the handset unit, the base unit assumes that the handset unit has missed the ring-on command and returned to the power cycling mode. The base unit then restores the header usage for the next ring-on command. The header is not transmitted with the ring-off commands inasmuch as the handset unit will remain awake if the ring alerting signal is being produced.

The ability to programmatically disable the header usage (after the first ring signal) allows the base unit to precisely synchronize the ring-alerting signal of the handset unit with any other ringing telephones on the premises. When the transmit header or preamble is included in the ring-on command transmission, actuation of the ring-alerting signal at the handset unit cannot begin until the command is completely received. Since this initial transmission comprises the header (575 milliseconds) and the synchronization/data fields (53 milliseconds), the ring-alerting signal in the handset unit is delayed by more than 600 milliseconds, thereby causing a noticeable delay. With the process described in FIG. 6, this delay only exists for the first ring, and reduces to less than 60 milliseconds on subsequent rings by dropping the header.

Figure 6:
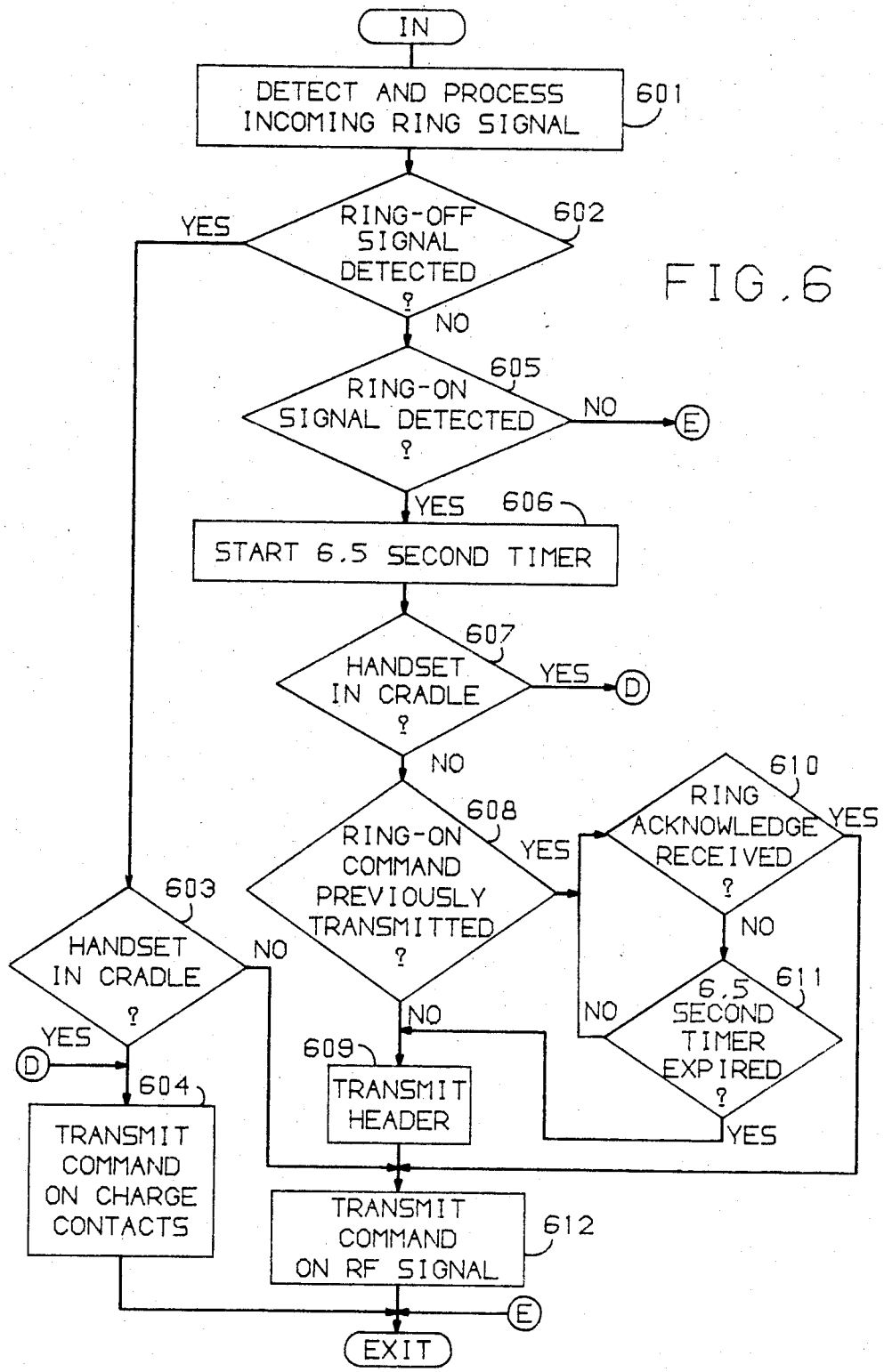
FIG. 6 depicts flow charts illustrating some of the processing performed by circuitry of a base unit in a cordless telephone system as related to usage, cancellation and restoration of the power-up command header for enhanced ring performance of the handset unit.

Referring now to FIG. 6, there is shown the ring time-out active process that is executed at the base unit. This process is responsive to receipt of ringing voltage on the tip and ring lines, and decides whether a header should be transmitted to the handset unit along with the ring-on command. For proper execution of this process, a base unit containing conventional ring-detection circuitry and also a microcomputer, radio transmitter and radio receiver, such as shown in FIG. 1, are all that is required.

The routine is entered at step 601 wherein ring-on and ring-off signals are provided in response to the ringing voltage being applied and being removed from the tip and ring lines. The process next advances to decision 602 where the ring-off signal provided by step 601 is detected. If the ring-off signal is detected, a ring-off command is transmitted to the handset unit to turn its acoustic sounder off. In this instance, the process advances to decision 603 where it is determined whether the handset is in or out of the cradle. If the handset is in the cradle, the process advances to decision 604 where the command for turning off the acoustic sounder is transmitted over the battery charge contacts then connecting the base unit and handset unit. From step 604, the routine is exited. If the handset unit is out of the cradle, the process advances to step 612 where the command for turning off the acoustic sounder in the handset is transmitted via the RF signal. From step 612, the routine is exited.

Referring once again to decision 602, if the ring-off signal is not detected, the process advances to decision 605 where a ring-on signal provided by step 601 is detected. If the ring-on signal is not detected, decision 605 causes the process to exit the routine. If the ring-on signal is detected, however, a ring-on command must be transmitted to the handset unit to turn its acoustic sounder on. The process next advances to decision 606 where the timer having a period of 6.5 seconds is started, and then to decision 607 where the process looks to see if the handset unit is in the cradle. If so, the process jumps to step 604 where the ring-on command is transmitted to the handset unit over the charge contacts.

If the handset unit is not in the cradle, the process advances to decision 608 where it is determined if the ring-on command was previously transmitted. If not, this is assumed to be the first time that the incoming ringing signal is detected by the base unit, and a header is transmitted via the RF signal to the handset unit at step 609. If a ring-on command was previously transmitted, the process advances to decision 610 which looks for a ring-acknowledge signal from the handset unit. If the ring-acknowledge signal has not yet been received, the process advances to the decision 611 where the time remaining on the timer in step 606 is monitored. If there is time still remaining, the process returns to decision 610 and looks again for the ring-acknowledge signal. If the time set by the timer has expired, the process advances to step 609 and transmits the header as if this were the first ringing signal received by the base unit. If in decision 610, it is determined that the ring-acknowledge signal from the handset unit has been received, then the header is not required, and the process advances to step 612 where just the ring-on command is transmitted via the RF signal. The routine is then exited until the next ring-on or ring-off signal is detected.

As earlier indicated, additional feature improvements are embodied in the invention to anticipate the state that is expected to be requested by a user under certain conditions and to automatically place the handset unit in such predicted state without waiting for a user command. For example, if the handset unit was previously in the TALK state when cradled, the base unit initiates a talk command sequence (opcode=9 hex) when the handset unit is uncradled to place the cordless telephone set automatically in the TALK state. This is possible since the base unit is arranged to remember the state of the handset unit just prior to the time that the handset unit is placed in the cradle on the base unit. This feature allows a user to operate the cordless telephone set as if it were a normal telephone set. Telephone calls are terminated and dial tone recalled by respectively cradling and uncradling the handset.

Another related operation at the base unit also provides for configuring the handset unit automatically. If the handset unit is removed from the cradle while it is ringing or between rings, circuitry in the base unit assumes that the user has uncradled the handset unit to answer the incoming call and automatically initiates a talk command sequence (opcode=9 hex) with the handset unit for placing the cordless telephone set in the TALK state.

The operation of these two automatic-talk features is depicted in the flowchart of FIG. 7A. The routine is entered at step 701 where the handset unit is detected as exiting the cradle in the base unit. As earlier indicated, information as to the state of the handset unit immediately prior to its being cradled is retained in memory by the base unit. Decision 701 thus determines whether the handset unit was in this talk state. If so, the process advances to step 704 where it waits 80 milliseconds to allow the circuits to stabilize and then sends a command over the RF path in step 705 to the handset unit to put it into the talk state. The routine is then exited after this step.

If the handset unit was not in the talk state immediately prior to it being cradled, the process advances to decision 703 where it is determined if the ring time-out active process described in FIG. 6 is active (handset unit is ringing or between rings). If so, then it is assumed that there is a ringing signal present at the base unit and that when the handset unit is lifted from the cradle, the user desires to answer that ring and so the process advances to step 704 after the handset is lifted. Again when the process advances to step 705, an RF command is sent to the handset unit to place it in the talk state. If when the handset is lifted, however, there is no ring time-out active process then being executed, the automatic-talk routine is exited.

Another automatic state control feature is provided to protect the user from inadvertently dropping a telephone call if the intercom state is requested during a telephone conversation. As depicted in the flow chart of FIG. 7B, the cordless telephone system automatically initiates a "hold" condition if it is in the TALK state when the intercom state is requested. Once the intercom conversation between the base unit and handset unit is over, the user then returns to the telephone call by simply depressing the TALK button to remove the "hold" condition.

With reference to FIG. 7B, the routine is entered at step 710 where reception of an intercom request is provided. Once the intercom request is received, the process advances to decision 711 which decides whether the handset unit was in the talk state at the time the intercom request was received. If not, the process advances to step 715 where the handset unit is placed directly in the intercom state for conversing with the base unit. If on the other hand, the intercom request was received while the handset unit was in the talk state, the process advances to decision 712 where it is determined if the user is then dialing a telephone number. If the user is not dialing at this point in time, the process advances first to step 713 where the telephone call is placed on hold and then to step 715 where the handset unit is placed in the intercom state. If the user does happens to be dialing while the intercom request is received, the process advances to step 714 where the dialing is terminated and then on to step 715 where the handset unit is placed in the intercom state. The process is then exited. As earlier indicated, the user recovers the telephone conversation by depressing the talk button to remove the hold condition.

Referring now to FIG. 8 there is shown an arrangement that provides enhanced performance for receiver circuitry of handset units having large stabilization times in the power-up processing operation.

It is recognized that certain types of data recovery circuits may not stabilize quickly enough after being activated to correctly recover data within the timing constraints described herein. More specifically, although the receiver may be properly demodulating data after a 10 milliseconds waiting time, the data recovery circuit may have an AC coupled threshold that could take much longer than 10 milliseconds to stabilize.

The AC threshold in a data recovery circuit is provided for tracking the digital data being received, and adjusts the DC level in the recovery circuit to the average, or center of the received data. The actual data is then compared to this tracking threshold to determine if the data is above or below the threshold. If the data is above the threshold, a high DC level output is provided from the data recovery circuit. If the data is below the threshold, a low DC voltage level output is provided.

Line 801 in FIG. 8 provides an illustration of how the threshold may take a relatively long time to adjust to the data output from a receiver 810 associated with a handset unit. In this illustration, the threshold reaches its optimum level after about 30 milliseconds. It is undesirable to leave the receiver turned on for 30 milliseconds during each power cycle, however, because of the additional drain this places on the battery. Using a two-step process hereinafter described greatly reduces the amount of time that the receiver must be turned on.

If a header is being transmitted by the base unit to the handset unit at the point when power is applied to the handset unit, the high data levels 802 and 804 provided by the data recovery circuit 811 will appear valid to the microprocessor 810 within 10 milliseconds after the power is applied. The low data levels may possibly appear invalid, however, due to false transitions 803 and 805 on the data that are caused by the then incorrect but adjusting threshold.

In the operation of the two-step process, once a valid high level, e.g. 802, of the header is detected, the microprocessor 812 remains on for another 20 milliseconds, and at that time looks for three consecutive valid levels 806, 807 and 808 (either two highs and one low as illustrated or two lows and one high). If a valid high level is not seen within the first 16 milliseconds, the microprocessor 812 decides that a header is not being transmitted and remains in the power cycling state by turning the receiver 810, the data recovery circuit 811 and itself off until the next power-on period occurs. After a total of only 16 milliseconds, therefore, a decision is made as to whether a header is likely to be present, even though the data recovery circuit may not have completely stabilized within this period.

Various other modifications of this invention are contemplated and may obviously be resorted to by those skilled in the art without departing from the spirit and scope of the invention as hereinafter defined by the appended claims.

What is claimed is:

1. A cordless telephone comprising:
   a base unit for connection to a telephone line, the base unit including a first transmitter and a first receiver for respectively transmitting signals to and receiving signals from a handset unit associated with the base unit;
   a handset unit with a second transmitter and a second receiver for respectively transmitting the signals to the first receiver and receiving the signals from the first transmitter in the base unit;
   control means for deactivating the second transmitter and reducing the on-time state of the second receiver while the handset unit is located remote from the base unit and in a standby state wherein no user initiated communications exists between the base unit and the handset unit; and
   coding means for storing in the base unit and the handset unit of the cordless telephone and for providing a common security code for establishing communications between the base unit and the handset unit, the coding means being transmitted as signals between the base unit and the handset unit in response to the presence of user initiated communications while the handset unit is located remote from the base unit, the handset unit being unresponsive to user initiated communication attempts by the base unit unaccompanied by the coding means and remaining in the reduced on-time state, and the base unit being unresponsive to user initiated communication attempts from the handset unit accompanied by the coding means.

2. The cordless telephone of claim 1 wherein the coding means includes a preamble for initiating the change of the second receiver from the reduced on-time state to a full-on operating state and the change of the second transmitter from a deactivated state to a full-on operating state, and wherein in response to user initiated communications at the base unit, the first transmitter provides the coding means to the second receiver and upon receipt of the coding means the second receiver changes from a reduced on-time state to a full-on operating state.

3. The cordless telephone of claim 2 wherein in response to user initiated communications at the base unit, the second transmitter changes from a deactivated state to a full-on operating state.

4. The cordless telephone of claim 3 wherein the user initiated communications at the base unit includes ringing voltage being provided to the base unit over the telephone line.

5. The cordless telephone of claim 1 wherein in response to user initiated communications at the handset unit, the second receiver changes from a reduced on-time state to a full-on operating state.

6. The cordless telephone of claim 5 wherein the control means for deactivating the second transmitter and reducing the on-time state of the second receiver comprises a computer, the computer also reducing its on-time state when the handset unit is in the standby state and changing to a full-on operating state in response to user initiated communications.

7. The cordless telephone of claim 6 wherein the second transmitter is operatively responsive to the computer in changing from a deactivated state to a full-on operating state in response to user initiated communications at the handset unit.

8. The cordless telephone of claim 1 wherein the coding means further comprises command information responsive to the user initiated communications, multiple codes of specific command information being selectable by the user in placing both the handset unit and the base unit in a desired communications mode, transferring of the specific command information occurring only between a handset unit and a base unit having the common security code.

9. The cordless telephone of claim 8 further including memory means for storing a communications mode for the handset and base units which immediately proceed certain other selected communications modes, the handset and base units reverting back to the immediately proceeding communications mode in response to user initiated communications.

10. The cordless telephone of claim 8 wherein each of the multiple codes of specific command information incorporates the security code for continually validating the user initiated communications initially established between the handset unit and the base unit.

11. The cordless telephone of claim 9 wherein the multiple codes of specific command information includes a ring-on code and a ring-off code transmitted by the first transmitter in the base unit for respectively activating and deactivating an acoustic sounder in the handset unit in response to ringing voltage being applied and removed from the telephone line connected to the base unit, a preamble for initiating the change of the second receiver and computer from the reduced on-time state to a full-on operating state and the second transmitter from a deactivated state to a full-on operating state being included for each initial ring-on code transmission from the first transmitter and for each subsequent ring-on code transmission that is not acknowledged by a ring-acknowledge code transmitted from the second transmitter in the handset unit to the first receiver in the base unit.

12. The cordless telephone of claim 9 wherein the multiple codes of specific command information further includes a channel change code transmitted by the second transmitter in the handset unit and received by the first receiver in the base unit, the channel change code enabling the transmitters and receivers of both the handset unit and the base unit to move to the next radio-frequency channel, this channel change code being executable while the handset unit is located remote from the base unit and in the standby state, and while a conversation is in progress.

13. A cordless telephone comprising:
a base unit for connection to a telephone line, the base unit including a first transmitter and a first receiver for respectively transmitting signals to and receiving signals from a handset unit associated with the base unit;
a handset unit with a second transmitter and a second receiver for respectively transmitting the signals to the first receiver and receiving the signals from the first transmitter in the base unit;
control means for deactivating the second transmitter and reducing the on-time state of the second receiver while the handset unit is located remote from the base unit and in a standby state wherein no user initiated communications exists between the base unit and the handset unit; and
coding means for storing in the base unit of the cordless telephone for providing a common security code for establishing communications between the base unit and the handset unit, the coding means being transmitted as signals from the base unit to the handset unit in response to user initiated communications while the handset unit is located remote from the base unit, the handset unit being unresponsive to user initiated communication attempts by the base unit unaccompanied by the coding means and remaining in the reduced on-time state.

14. The cordless telephone of claim 13 wherein the coding means includes a preamble for initiating the change of the second receiver from the reduced on-time state to a full-on operating state and the change of the second transmitter from a deactivated state to a full-on operating state, and wherein in response to user initiated communications at the base unit, the first transmitter provides the coding means to the second receiver and upon receipt of the coding means the second receiver changes from a reduced on-time state to a full-on operating state.

15. The cordless telephone of claim 14 wherein in response to user initiated communications at the base unit, the second transmitter changes from a deactivated state to a full-on operating state.

16. The cordless telephone of claim 15 wherein the user initiated communications at the base unit includes ringing voltage being provided to the base unit over the telephone line.

17. The cordless telephone of claim 13 wherein in response to user initiated communications at the handset unit, the second receiver changes from a reduced on-time state to a full-on operating state.

18. The cordless telephone of claim 17 wherein the control means for deactivating the second transmitter and reducing the on-time state of the second receiver comprises a computer, the computer also reducing its on-time state when the handset unit is in the standby state and changing to a full-on operating state in response to user initiated communications.

19. The cordless telephone of claim 18 wherein the second transmitter is operatively responsive to the computer in changing from a deactivated state to a full-on operating state in response to user initiated communications at the handset unit.

20. The cordless telephone of claim 13 wherein the coding means further comprises command information responsive to the user initiated communications, multiple codes of specific command information being selectable by the user in placing both the handset unit and the base unit in a desired communications mode, transferring of the specific command information occurring only between a handset unit and a base unit having the common security code.

21. The cordless telephone of claim 20 further including memory means for storing a communications mode for the handset and base units which immediately proceed certain other selected communications modes, the handset and base units reverting back to the immediately proceeding communications mode in response to user initiated communications.

22. The cordless telephone of claim 20 wherein each of the multiple codes of specific command information incorporates the security code for continually validating the user initiated communications initially established between the handset unit and the base unit.

23. The cordless telephone of claim 21 wherein the multiple codes of specific command information includes a ring-on code and a ring-off code transmitted by the first transmitter in the base unit for respectively activating and deactivating an acoustic sounder in the handset unit in response to ringing voltage being applied and removed from the telephone line attached to the base unit, a preamble for initiating the change of the second receiver and computer from the reduced on-time state to a full-on operating state and the second transmitter from a deactivated state to a full-on operating state being included for each initial ring-on code transmission from the first transmitter and for each subsequent ring-on code transmission that is not acknowledged by a ring-acknowledge code transmitted from the second transmitter in the handset unit to the first receiver in the base unit.

24. The cordless telephone of claim 21 wherein the multiple codes of specific command information further includes a channel change code transmitted by the second transmitter in the handset unit and received by the first receiver in the base unit, the channel change code enabling the transmitters and receivers of both the handset unit and the base unit to move to the next radio-frequency channel, this channel change code being executable both before initiating a telephone call and while the user continues a call in progress.

25. A method of communicating over a cordless telephone having a base unit for connection to a telephone line, the base unit including a first transmitter and a first receiver for respectively transmitting signals to and receiving signals from a handset unit associated with the base unit, and the handset unit including a second transmitter and a second receiver for respectively transmitting the signals to the first receiver and receiving the signals from the first transmitter in the base unit, the method comprising the steps of:

deactivating the second transmitter and reducing the on-time state of the second receiver while the handset unit is located remote from the base unit and in a standby state wherein no user initiated communications exists between the base unit and the handset unit; and storing a predetermined signal code in the base unit and the handset unit of the cordless telephone for transmission between the base unit and the handset unit in response to user initiated communications while the handset unit is located remote from the base unit, the signal code including a common security code for establishing communications between the base unit and the handset unit, the handset unit being unresponsive to user initiated communication attempts by the base unit unaccompanied by the signal code and remaining in the reduced on-time state, and the base unit being unresponsive to user initiated communication attempts from the handset unit unaccompanied by the signal code.

26. The method pursuant to claim 25 further comprising the steps of transmitting the predetermined signal code from the first transmitter to the second receiver in response to user initiated communications at the base unit; and changing the state of the second receiver from a reduced on-time state to a full-on operating state upon receipt of the signal code, the signal code including a preamble section for initiating the change of the second receiver from the reduced on-time state to the full-on operating state.

27. The method pursuant to claim 26 further comprising the step of changing the state of the second transmitter from a deactivated state to a full-on operating state upon receipt of the signal code, the preamble section for initiating the change of the second receiver also initiating the change of the second transmitter from a deactivated state to a full-on operating state.

28. The method pursuant to claim 27 wherein the user initiated communications at the base unit includes ringing voltage being provided to the base unit over the telephone line.

29. The method pursuant to claim 25 further comprising the step of changing the second receiver from a reduced on-time state to a full-on operating state in response to user initiated communications at the handset unit.

30. A method of communicating over a cordless telephone having a base unit for connection to a telephone line, the base unit including a first transmitter and a first receiver for respectively transmitting signals to and receiving signals from a handset unit associated with the base unit, and the handset unit including a second transmitter and a second receiver for respectively transmitting the signals to the first receiver and receiving the signals from the first transmitter in the base unit, the method comprising the steps of:

deactivating the second transmitter and reducing the on-time state of the second receiver while the handset unit is located remote from the base unit and in a standby state wherein no user initiated communications exists between the base unit and the handset unit; and storing a predetermined signal code in the base unit of the cordless telephone for transmission to the handset unit in response to user initiated communications, the signal code including a common security code for establishing communications between the base unit and the handset unit, the handset unit being unresponsive to user initiated communication attempts by the base unit unaccompanied by the signal code and remaining in the reduced on-time state.

31. The method pursuant to claim 30 further comprising the step of changing the second receiver from a reduced on-time state to a full-on operating state in response to user initiated communications at the handset unit.

32. The method pursuant to claim 30 further comprising the steps of transmitting the predetermined signal code from the first transmitter to the second receiver in response to user initiated communications at the base unit; and changing the state of the second receiver from a reduced on-time state to a full-on operating state upon receipt of the signal code, the signal code including a preamble section for initiating the change of the second receiver from the reduced on-time state to the full-on operating state.

33. The method pursuant to claim 32 further comprising the step of changing the state of the second transmitter from a deactiveted state to a full-on operating state upon receipt of the signal code, the preamble section for initiating the change of the second receiver also initiating the change of the second transmitter from a deactivated state to a full-on operating state.

34. The method pursuant to claim 33 wherein the user initiated communications at the base unit includes ringing voltage being provided to the base unit over the telephone line.

* * * * *

UNITED STATES PATENT AND TRADEMARK OFFICE
CERTIFICATE OF CORRECTION

PATENT NO. : 4,731,814

DATED : March 15, 1988

INVENTOR(S) : William R. Becker, James J. Boyd, III; William J. Clifford, Paul B. Newland It is certified that error appears in the above-identified patent and that said Letters Patent is hereby corrected as shown below:

In Claim 1, Column 13, line 7, "accompanied" should read --unaccompanied--.

Signed and Sealed this

Fifth Day of June, 1990

Attest:

HARRY F. MANBECK, JR.

Attesting Officer

Commissioner of Patents and Trademarks